Patented Apr. 25, 1950

2,505,698

UNITED STATES PATENT OFFICE 2,505,698

INSECTICIDAL COMPOSITIONS CONTAINING PYRETHRIN AND ROTENONE EXTRACTS

Herman Wachs, Brooklyn, and Kurt Kulka, New York, N. Y., assignors, by mesne assignments, to U. S. Industrial Chemicals, Inc., New York, N. Y., a corporation of Delaware No Drawing. Application February 27, 1946, Serial No. 650,725

10 Claims. (Cl. 167—24)

This invention relates to insecticide compositions and more particularly to compositions made by dissolving resinous extracts containing pyrethrins, rotenone, etc. in special high boiling solvents which enable substantially complete solution to be obtained of the resin constituents.

Commercial pyrethrum extracts made by extracting pyrethrum flowers with various solvents vary in concentration and purity. Such extracts, on removal of the solvents, are resinous or oleoresinous in character. Such extracts, concentrates or oleoresins of pyrethrum are used in the preparation of insecticides in various ways, as by dissolving in Freon, as in the so-called "aerosol bombs" (Goodhue, Ind. Eng. Chem., 34, 1456) or by diluting with a suitable petroleum fraction to form a so-called "household spray," or by combining with an emulsifying agent to make them miscible with water so that they may be used in a so-called "horticultural spray" or in an animal spray or dip or by physically incorporating them into a suitable finely powdered absorbent material for use as a dust insecticide. The use of such resinous extracts, however, presents difficulties because of incomplete solution in the solvent used or inhibition of their activity by the occlusion of the pyrethrins in the resinous precipitate or colloidal suspension which results when other natural substances are present in the extract and are not completely soluble in the medium employed.

Rotenone extracts are similarly made by extracting rotenone containing roots such as derris or cube, the customary practice being to remove the extracting solvent, leaving a more or less hard, brittle mass commonly referred to as rotenone resins and consisting of rotenone plus a number of other insecticidally active substances closely related to rotenone and other natural constituents of the root which are soluble in the solvents used for extraction. These resins are widely used in the manufacture of horticultural or agricultural sprays, and are also used in other cases such as the preparation of impregnated dust concentrates in which the resins are physically deposited on or in an absorbent base material which is further used to make insecticidal dusts or in some cases sprays. The solvents commonly used for such resins present difficulties because of incomplete solution of the resin constituents under normal conditions of storage and use and because of the danger that the precipitation or colloidal separation even of inactive ingredients tends to inhibit the usefulness of the active ingredients. It is known that benzol and chloroform are quite satisfactory solvents but both are objectionable because of their volatility and their toxicity to human beings.

The present invention enables these objections and limitations to be overcome or minimized and enables the pyrethrum and rotenone extracts to be used with complete or substantially complete solution of the resinous constituents, thereby enabling the resins to be used in an effective state of solution and with avoidance of the occlusion of the pyrethrum or rotenone in insoluble or precipitated resinous constituents.

We have found that certain compounds, which have little or no insecticidal activity of their own, have the valuable property of dissolving the resins, thereby making available the pyrethrins and rotenone so that their activity is not inhibited by occlusion in resinous precipitates or colloidal suspensions. The present invention enables solutions and also impregnated dusts to be made from pyrethrum extracts and rotenone extracts with all the constituents of the extracts in solution; and, when these extracts are impregnated on or in an absorbent carrier for making impregnated dusts the extracts will be held by an essentially non-volatile solvent so that the solvent will remain in association with the active insecticidal principles in the impregnated dusts and thereby increase the degree of contact between the actual principles and the insect.

The non-volatile solvents used for dissolving the insecticidal resins may be represented by the following general formula:

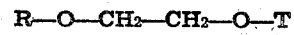

in which R is an alkyl substituted aryl radical with from 3 to 8 alkyl carbon atoms in the alkyl substituents and in which T represents or includes the group,

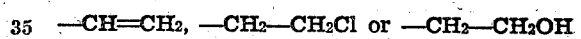

The alkyl substituent or substituents may be a single alkyl group or two or more alkyl groups with the total number of carbon atoms not less than 3 and not more than 8. In the case of a dialkyl substituted aryl group the compounds may be represented by the following general formula:

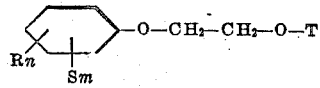

where T has the meaning above indicated and where R and S are alkyl groups and n and m the number of carbon atoms in the alkyl groups with the sum of $n+m$ not less than 3 or more than 8.

The compounds in which T is the chlorethyl group ($-CH_2-CH_2Cl$) may be readily prepared by reacting the dry sodium salts of the corresponding alkyl substituted phenols with dichlordiethylether. When sodium hydroxide is used in an amount which is somewhat in excess of that required to form the phenylate with the phenol, the formation of the above compound may be accompanied by the formation of the other compounds so that the resulting product is a mixture of all three of the above compounds, that is, with T having the meanings above indicated. Some dialkyldiphenylethers may also be formed by reaction of two mols of the alkyl phenylate with one mol of dichlordiethylether, but these are non-volatile and can be separated from the product by vacuum distillation of the product.

Various alkyl phenols can be reacted with the dichlordiethylether in making the new solvents, the alkyl phenols containing from 3 to 8 carbon atoms in the alkyl substituent or substituents. Among the alkyl phenols which can be so used are butyl and amyl phenols, carvacrol, thymol, parathymol, butyl cresol, diethylphenol, dibutylphenol, amyl cresol, diethylcresol, hexylcresol, hexylphenol, etc. A particularly advantageous form of alkyl phenol is the mixture of alkyl phenols obtained as a byproduct in the manufacture of thymol, this mixture containing essentially isopropyl cresols (such as parathymol) and diisopropyl cresols.

The preparation of the solvents for use in the invention will be further illustrated by the following examples, but it will be understood that the invention is not limited thereto. The parts are by weight:

Example I.—A mixture of 176 parts of sodium hydroxide, 900 parts of isopropanol and 600 parts of thymol is agitated under a reflux condenser until a clear solution is obtained and 1144 parts of dichlordiethylether are added and this mixture agitated on a steam bath under reflux for 36 hours, the isopropanol is then distilled off, the remainder is washed with water, the excess of isopropyl ether is removed on a steam bath under a vacuum of about 500 mm. and the residue is then distilled from an oil bath under a vacuum of about 5 mm. A colorless oil is obtained as a distillate at a temperature range of 167–170° C. at 5 mm. The principal constituent of this oil is a compound having the formula:

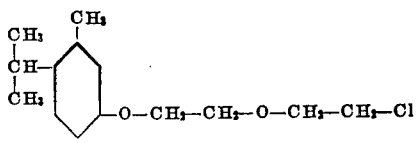

To some extent the action of the caustic soda present in the original reaction mixture may remove chlorine and convert the above compound into a compound in which the terminal group is —CH=CH₂ instead of —CH₂—CH₂Cl. To the extent that hydrolysis takes place some of the chlorine compound may be converted to the hydroxy compound having the terminal group —CH₂—CH₂OH.

The chloride formed in the above example may be converted more or less completely into a mixture of the corresponding unsaturated compound and the alcohol by prolonged heating with an excess of alkali in isopropanol solution, as illustrated by the following example:

Example II.—A mixture of 257 parts of the chloride of Example I and of the formula there indicated is mixed with 60 parts of sodium hydroxide and 600 parts of isopropanol and refluxed for 48 hours. The solvent is then distilled off, the oil washed with water, and then distilled in vacuo. A highly unsaturated mixture distills over within the boiling range of 124–157° C. at 1 mm.

The compounds in which T of the above formula is —CH₂—CH₂Cl or —CH₂—CH₂OH or —CH₂=CH₂ are all effective solvents and under the conditions of the reactions described above all three seem to be present to a smaller or larger extent and they do not lend themselves to easy separation. The solvent power of the composition containing an equal number of carbons in the alkyl substituents of the benzene ring is of similar order whether the chloride predominates or whether the unsaturated group predominates, provided the sum of the carbon atoms on the alkyl substituent or substituents of the benzene ring is a minimum of 3 and a maximum of 8. Such products are capable of separation from the reaction mixture by vacuum distillation under a high vacuum, thereby obtaining them free from any diphenylethers which may be simultaneously formed by the reaction of two mols of alkyl phenol with one mol of dichlordiethylether. These alkyl substituted diphenylethers are not satisfactory solvents and when present reduce the solvent power of the compounds above described.

The solvents produced as above described are valuable solvents for dissolving pyrethrin and rotenone extracts and resins.

Thus a commercial pyrethrum extract containing 20% pyrethrins has to be diluted to the extent of approximately 1 part to 150 parts with kerosene to yield the commonly used household sprays; but upon the addition of commercial pyrethrum extract to kerosene the latter becomes cloudy and ultimately a precipitate will be formed. But when the solvent compositions of the above examples are added to the 20% pyrethrum extract to the extent of 30–100% of the extract, the mixture may be added to kerosene in any proportions and the resulting solution will stay clear even after cooling to 0° C.

A pyrethrum extract containing 20% pyrethrins when tested for Freon insoluble solids according to the method of H. Wachs et al. (Ind. Eng. Chem., Anal. Ed., vol. 16, page 453) showed solids in excess of 6%. This extract was unsuited for use in aerosol bombs because of the difficulties it would introduce to the handling of the Freon solution, such as blocking of pipe lines during filling of the containers, or blocking of the capillary tubes when the Freon solution is discharged from the bombs. However, when an equal weight of the solvent compositions of the above examples was added to the pyrethrum extract the insoluble solids were reduced to 1.64% and the extract was satisfactory for use in aerosol bombs (Goodhue, Ind. Eng. Chem., 34. 1456)

Solutions of pyrethrin concentrates or resins in the high boiling and substantially non-volatile solvents gives solutions which prevent the formation of resinous precipitates when they are used with solvent-diluents, for example, when added to petroleum fractions or when dissolved in Freon to form household sprays or the so-called "aerosol bombs." Likewise, such solutions of the pyrethrin and admixed resin constituents in the solvents can be incorporated into a dust with finely divided absorbent material and the presence of the non-volatile solvent increases the activity of the pyrethrins by keeping the resin in solution and by improving the contact action of the pyrethrins on the insects.

Rotenone resins can similarly be formed into solutions with the non-volatile solvents and used to particular advantage. Thus a concentrate to be used in the agricultural field may be produced by dissolving 1 part of rotenone bearing resin (derris resin) in 4 parts of the non-volatile solvent of the above examples. A solution is thus produced which will not deposit any insoluble resin or crystals even after three months' standing. This solution can be mixed with an emulsifying agent such as sulfonated castor oil in equal proportions so that the mixture will contain about 10% of resin and this mixture can then be emulsified with water in any desired proportions to form a so-called "horticultural spray."

Rotenone resins can be used to particular advantage with the non-volatile solvents in making insecticide compositions. Rotenone resins such as derris or cube resin which are hard, brittle mixtures contain highly toxic constituents other than rotenone itself and the present invention makes possible the utilization of other toxic constituents of such resins. Many solvents commonly used for rotenone resins do not dissolve all of the constituents of the resins completely or keep them in solution under normal conditions of storage and use. Known solvents that will dissolve rotenone bearing resins such as benzol and chloroform are toxic to humans and are very volatile and upon evaporation leave the resin in the original solid form. We have found, however, that the solvents of the formula above indicated will dissolve the resins readily and completely and the resulting solutions can be used to advantage in making insecticidal compositions. Thus when used with suitable finely powdered absorbent material to form an agricultural dust the non-volatile solvent keeps the resins in liquid form which increases the toxicity of the resins to insects by improving the contact. And such solutions can be advantageously used in making agricultural or cattle sprays by mixing with emulsifying agents and emulsifying with water.

The new compositions made by dissolving the pyrethrin and rotenone resins in the non-volatile solvents thus present many advantages. The solvents are very high boiling and for practical purposes non-volatile under conditions of use. They are odorless, and relatively non-toxic to domestic animals and humans and are non-irritating to the nose and to the skin so that they may be readily used in indoor sprays, while they exert a preservative action for the easily oxidized and reactive compounds such as pyrethrins and rotenone.

We claim:

1. A concentrated insecticide composition comprising at least one insecticide selected from the class consisting of pyrethrin and rotenone in the form of an extract containing resinous material dissolved in a liquid solvent having the following formula:

$$R-O-CH_2-CH_2-O-T$$

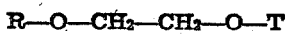

where R is an alkyl substituted and otherwise unsubstituted phenyl group having from 3 to 8 alkyl carbons and T is selected from the group which consists of $CH_2-CH_2Cl$, $CH_2-CH_2-OH$ and $CH=CH_2$, said liquid solvent being miscible with petroleum solvents and dichlorodifluoromethane, whereby the concentrated composition including the resinous material of the insecticide may be put into solution in such solvent-diluents.

2. A concentrated insecticide composition as set forth in claim 1 in which the insecticide is pyrethrin in the form of an extract containing resinous material.

3. A concentrated insecticide composition as set forth in claim 1 in which the insecticide is pyrethrin in the form of an extract containing resinous material and in which the solvent is present in amount from about 30% to 100% of the weight of the pyrethrin extract.

4. A concentrated insecticide composition as set forth in claim 1 in which the solvent is $R-(-O-C_2H_4-)_2-Cl$ where R is the 3-methyl-4-isopropylphenyl radical.

5. A concentrated insecticide composition as set forth in claim 1 in which the insecticide is pyrethrin in the form of an extract containing resinous material and the solvent is $$R-(-O-C_2H_4-)_2-Cl$$

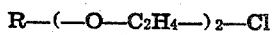

where R is the 3-methyl-4-isopropylphenyl radical.

6. An insecticide composition comprising a solvent-diluent, at least one insecticide selected from the class consisting of pyrethrin and rotenone in the form of an extract containing resinous material dissolved in said solvent-diluent, at least a portion of such resinous material normally being insoluble in said solvent-diluent, and a liquid solvent for such insoluble resinous material which is miscible with the solvent-diluent, whereby such normally insoluble resinous material is placed in solution in the solvent-diluent, said liquid solvent having the following formula:

$$R-O-CH_2-CH_2-O-T$$

where R is an alkyl substituted and otherwise unsubstituted phenyl group having from 3 to 8 alkyl carbons and T is selected from the group which consists of $CH_2-CH_2Cl$, $CH_2-CH_2-OH$ and $CH=CH_2$.

7. An insecticide composition as set forth in claim 6 in which the insecticide is pyrethrin in the form of an extract containing resinous material.

8. An insecticide composition as set forth in claim 6 in which the insecticide is pyrethrin in the form of an extract containing resinous material, and in which the solvent-diluent comprises a petroleum solvent.

9. An insecticide composition as set forth in claim 6 in which the insecticide is pyrethrin in the form of an extract containing resinous material and in which said liquid solvent is $R-(-O-C_2H_4-)_2-Cl$ where R is the 3-methyl-4-isopropylphenyl radical.

10. An insecticide composition as set forth in claim 6 in which the insecticide is pyrethrin in the form of an extract containing resinous material and in which said liquid solvent is from about 30% to 100% of the weight of the pyrethrin extract.

HERMAN WACHS.
KURT KULKA.

REFERENCES CITED

The following references are of record in the file of this patent:

UNITED STATES PATENTS

| Number | Name | Date |
|---|---|---|
| 1,633,927 | Davidson | June 28, 1927 |
| 2,097,441 | Bruson | Nov. 2, 1937 |
| 2,098,203 | Bruson | Nov. 2, 1937 |
| 2,205,394 | Coleman et al. | June 25, 1940 |
| 2,210,900 | Coleman | Aug. 13, 1940 |